United States Patent
Ikeda

(10) Patent No.: US 8,767,197 B2
(45) Date of Patent: Jul. 1, 2014

(54) AUTOMATIC ANGLE ADJUSTMENT UNIT FOR USE IN OBJECT DETECTION DEVICE

(71) Applicant: Optex Co., Ltd., Otsu (JP)

(72) Inventor: Hiroyuki Ikeda, Otsu (JP)

(73) Assignee: Optex Co., Ltd., Shiga (JP)

(*) Notice: Subject to any disclaimer, the term of this patent is extended or adjusted under 35 U.S.C. 154(b) by 45 days.

(21) Appl. No.: 13/669,825

(22) Filed: Nov. 6, 2012

(65) Prior Publication Data

US 2013/0120744 A1    May 16, 2013

(30) Foreign Application Priority Data

Nov. 10, 2011    (JP) .................................. 2011-246779

(51) Int. Cl.
  *G01B 11/26* (2006.01)
  *H04B 10/00* (2013.01)
  *G01V 8/20* (2006.01)
  *H04B 10/112* (2013.01)
  *H04B 10/114* (2013.01)

(52) U.S. Cl.
  CPC . *G01B 11/26* (2013.01); *G01V 8/20* (2013.01); *H04B 10/1123* (2013.01); *H04B 10/1143* (2013.01)
  USPC .......................................... 356/138; 398/129

(58) Field of Classification Search
  CPC .......... G01B 11/26; G01B 11/27; G01B 7/30; G01B 5/24; G01B 3/56; H04B 10/1125; H04B 10/1127; H04B 10/1143; H04B 10/118; H04B 10/1149; G08B 13/183; G08B 29/22; G01V 8/20; G01V 8/10
  USPC ......... 356/127, 138–155, 399–401, 614–624; 398/129; 343/758, 761, 880, 907, 915, 343/916; 33/276–279, 281, 282, 285, 286, 33/290, 291; 73/866.5; 455/90.3; 108/137–144.11; 248/550
  See application file for complete search history.

(56) References Cited

U.S. PATENT DOCUMENTS 5,217,417 A * 6/1993 Zhengang ...................... 475/175
6,076,266 A * 6/2000 Beckingham et al. .......... 33/292

(Continued)

FOREIGN PATENT DOCUMENTS

| EP | 1868171 A1 | 12/2007 |
|---|---|---|
| JP | 2009-087240 A | 4/2009 |
| WO | 9963263 A1 | 12/1999 |
| WO | 2008031739 A1 | 3/2008 |

OTHER PUBLICATIONS

European Search Report; Application No. 12192045.8-1812; Mar. 15, 2013.

*Primary Examiner* — Gregory Toatley
*Assistant Examiner* — Violeta A Prieto
(74) *Attorney, Agent, or Firm* — Sughrue Mion, PLLC

(57) ABSTRACT

An automatic angle adjustment unit (70) engages with and drivers a horizontal adjustment-engagement member (33) and a vertical adjustment-engagement member (37) of an object detection device (D) from the exterior. The unit (70) includes: engagement-drive transmission sections (72 and 73) which removably engages with both adjustment-engagement members (33 and 37), from the front surface, and drives both adjustment-engagement members (33 and 37); clamping section (76) that is removably secured to the object detection device (D); and an adjustment unit control section (80) for performing a control for adjusting a horizontal angle and a vertical angle of an optical system, based on a detection signal level.

7 Claims, 12 Drawing Sheets

(56) References Cited

U.S. PATENT DOCUMENTS

| | | | |
|---|---|---|---|
| 6,819,240 B2* | 11/2004 | Iwasawa et al. | 340/541 |
| 7,113,144 B2* | 9/2006 | Lin et al. | 343/880 |
| 7,142,168 B1* | 11/2006 | Sinclair | 343/882 |
| 7,636,162 B2* | 12/2009 | Ogawa et al. | 356/399 |
| 2003/0058094 A1 | 3/2003 | Iwasawa et al. | |
| 2003/0106992 A1* | 6/2003 | Koyama et al. | 250/221 |
| 2003/0193397 A1 | 10/2003 | Ikeda | |
| 2004/0047634 A1* | 3/2004 | Nagai | 398/118 |
| 2005/0168711 A1* | 8/2005 | Iwasawa | 353/122 |
| 2006/0018663 A1* | 1/2006 | Moursund et al. | 398/135 |
| 2006/0115260 A1* | 6/2006 | Nomura | 396/268 |
| 2006/0215021 A1 | 9/2006 | Suto et al. | |
| 2009/0059483 A1* | 3/2009 | Ikeda | 361/679.01 |
| 2010/0127946 A1 | 5/2010 | Tung | |
| 2010/0247106 A1 | 9/2010 | DiPoala | |
| 2013/0119257 A1* | 5/2013 | Ikeda et al. | 250/347 |
| 2013/0120745 A1* | 5/2013 | Ikeda | 356/138 |
| 2013/0193323 A1* | 8/2013 | Makino et al. | 250/338.1 |

* cited by examiner

AUTOMATIC ANGLE ADJUSTMENT UNIT FOR USE IN OBJECT DETECTION DEVICE

CROSS REFERENCE TO THE RELATED APPLICATION

This application is based on and claims Convention priority to Japanese patent application No. 2011-246779, filed Nov. 10, 2011, the entire disclosure of which is herein incorporated by reference as a part of this application.

BACKGROUND OF THE INVENTION

1. Field of the Invention

The present invention relates to an automatic angle adjustment unit that automatically adjusts angles of a detection unit from the exterior, for an object detection device which receives, by section of a receiver, detection beams transmitted from a transmitter and detects for an object based on the reception level.

2. Description of Related Art

In general, a transmitter-receiver opposing type object detection device includes: a transmitter having a transmitting optical system (detection unit) for transmitting detection beams, such as infrared rays, for object detection; and a receiver that is disposed so as to oppose the transmitter and has a receiving optical system (detection unit) for receiving the detection beams and outputting a detection signal, and the object detection device of this type detects an object according to change of a detection signal level that is caused by an intervention between the two detection units, and has an angle adjustment mechanism for adjusting an optical axis (angle) of each detection unit. When the optical axis is adjusted, a vertical angle of each detection unit about a horizontal axis and a horizontal angle of each detection unit about a vertical axis are manually adjusted by visual observation with the use of a sighting device, thereby adjusting the optical axis.

On the other hand, an automatic angle adjustment device with an infrared sensor for automatically adjusting an optical axis has been known to date (see, for example, Japanese Laid-Open Patent Publication No. 2009-87240). In this angle adjustment mechanism, an optical axis of a transmitter is oscillated or swung by predetermined angles in two directions orthogonal to each other, and is set at an angular position obtained when a level of a signal received by a receiver is maximal. The optical axis is automatically oscillated by driving a motor in the device according to a signal level.

However, in Japanese Laid-Open Patent Publication No. 2009-87240, in order to automatically adjust the optical axis, an automatic angle adjustment section including: a driving motor for adjusting a vertical angle and a horizontal angle; and a control section thereof, is incorporated in the device, thereby increasing the size and cost of the entirety of the device.

On the other hand, a detection device and an automatic angle adjustment section may be separated from each other, and an optical axis may be automatically adjusted by an automatic angle adjustment unit from the exterior of the device. However, in a typical angle adjustment mechanism, a vertical rotation component for rotating the detection unit about a horizontal axis is incorporated so as to be mounted on a horizontal rotation component for rotating the detection unit about a vertical axis. Further, a horizontal adjustment component, like a dial, which is connected to the horizontal rotation component and drives the horizontal rotation component, and an adjustment component, like a screw, which is connected to the vertical rotation component and drives the vertical rotation component, are provided so as to be spaced from each other. When change of a position of the horizontal rotation component causes change of a position of the vertical rotation component, a position of the adjustment component is also changed. Therefore, there is a structural problem that the automatic angle adjustment unit cannot be easily attached to and detached from the device.

SUMMARY OF THE INVENTION

In view of the foregoing, the present invention has been deviced to make available an external automatic angle adjustment unit, for use in an object detection device having an angle adjustment mechanism, which is structured to have a reduced size, and enable cost reduction and facilitation of its attachment and detachment, and which enables an automatic angle adjustment to be easily performed from the exterior.

An automatic angle adjustment unit according to an aspect of the present invention is for use in an object detection device, the object detection device causing a receiving detection unit of a receiver to receive detection beams, for object detection, transmitted from a transmitting detection unit of a transmitter and to output a detection signal. The object detection device includes an angle adjustment mechanism that has a horizontal adjustment-engagement member and a vertical adjustment-engagement member, disposed adjacent to each other, which adjust a horizontal angle of the detection unit rotatable about a vertical axis and a vertical angle of the detection unit rotatable about a horizontal axis.

The automatic angle adjustment unit is engageable with the horizontal adjustment-engagement member and the vertical adjustment-engagement member of the object detection device, drives both adjustment-engagement members from the exterior, and adjusts the horizontal angle and the vertical angle of the detection unit, to perform automatic angle adjustment. The automatic angle adjustment unit includes:

an engagement-drive transmission section that removably engages with the horizontal adjustment-engagement member and the vertical adjustment-engagement member from the exterior, and drives both adjustment-engagement members; a driving section for driving the engagement-drive transmission section; a clamping section for removably securing the automatic angle adjustment unit to the object detection device; a level input section for receiving the detection signal level inputted from the object detection device; and an adjustment unit control section for performing a control for causing the driving section to drive the engagement-drive transmission section based on the detection signal level, to adjust the horizontal angle and the vertical angle of the detection unit.

In these features, the automatic angle adjustment unit removably engages with the horizontal adjustment-engagement member and the vertical adjustment-engagement member of the object detection device, from the exterior, with ease, and drives the adjustment-engagement members to adjust the horizontal angle and the vertical angle of the optical system. Thus, the size and cost are reduced, and the attachment and detachment thereof is facilitated, and an automatic angle adjustment can be easily performed from the exterior.

Preferably, the clamping section includes an ejection member that operates in conjunction with the automatic angle adjustment unit being disengaged from the object detection device such that the engagement-drive transmission section is moved in a direction opposite to a direction in which the engagement-drive transmission section engages with the horizontal adjustment-engagement member and the vertical adjustment-engagement member, to cancel the engagement therebetween. Therefore, engagement between the engagement-drive transmission section and each of the horizontal adjustment-engagement member and the vertical adjustment-engagement member can be smoothly canceled.

Preferably, the automatic angle adjustment unit includes: a GPS section for obtaining positional information; and a communication section for communicating and exchanging the positional information between a plurality of the automatic angle adjustment unit, and a coarse adjustment of an angle for the object detection device is automatically performed based on the positional information. Therefore, a sighting device for a coarse adjustment may be omitted.

An object detection system having another aspect of the present invention includes: the automatic angle adjustment unit described above; and an object detection device for causing a receiving detection unit of a receiver to receive detection beams, for object detection, transmitted from a transmitting detection unit of a transmitter and to output a detection signal, the object detection device including: an angle adjustment mechanism that has a horizontal adjustment-engagement member and a vertical adjustment-engagement member, disposed adjacent to each other, which adjust the horizontal angle and the vertical angle of the detection unit. The adjustment unit control section of the automatic angle adjustment unit has peak position determination section for determining a peak position of the detection signal level, drives the driving section, and causes the engagement-drive transmission section to stop the horizontal adjustment-engagement member and the vertical adjustment-engagement member at a position corresponding to the determined peak position of the detection signal level, to set the horizontal angle and the vertical angle of the detection unit of the object detection device.

In these features, the object detection system is structured so as to have a reduced size and enable cost reduction, and enables the object detection device and an external automatic angle adjustment unit to be easily attached to and detached from each other, thereby enabling an automatic angle adjustment to be easily performed from the exterior.

Preferably, the peak position determination section obtains peak positions for two directions, which are a forward direction and an opposite direction, in rotation of each of the horizontal adjustment-engagement member and the vertical adjustment-engagement member, and determines, as the peak position, a midpoint between the peak positions of the detection signal levels for the two directions. Further, when the detection signal level represents a saturated state, the peak position determination section determines the peak position of the detection signal level based on a midpoint between a rising edge position at which a saturation point is reached, and a falling edge position at which the saturated state ends. Furthermore, after a vertical adjustment is performed and a horizontal adjustment is then performed, or after the horizontal adjustment is performed and the vertical adjustment is then performed, the peak position determination section performs the vertical adjustment or the horizontal adjustment by repeating one of the vertical adjustment or the horizontal adjustment at least once, to determine the peak position of the detection signal level. Therefore, an angle adjustment can be performed with an enhanced accuracy.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Figure 1A:
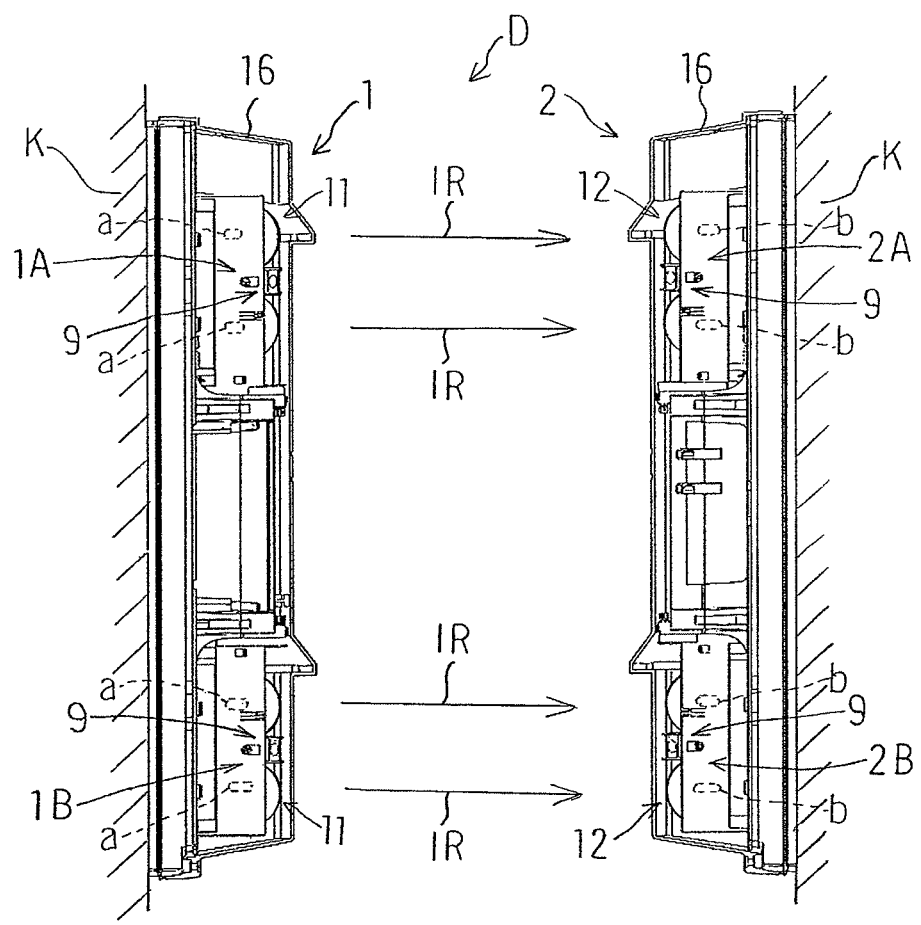
FIG. 1A is a schematic side view of an object detection device having an angle adjustment mechanism for which an automatic angle adjustment unit according to a first embodiment of the present invention is used.

Hereinafter, preferred embodiments of the present invention will be described with reference to the drawings. FIG. 1A is a schematic side view of an object detection device having an angle adjustment mechanism according to a first embodiment of the present invention. An object detection device D includes: a transmission section 1 having a transmitter 1A and a transmitter 1B; and a reception section 2 having a receiver 2A and a receiver 2B. Each of the transmitter 1A and the transmitter 1B includes transmitting elements a. The transmitters 1A and 1B are disposed one above the other. In the present embodiment, the transmitter 1A is disposed above the transmitter 1B. The receiver 2A and the receiver 2B are disposed so as to oppose the transmitter 1A and the transmitter 1B, and each include receiving elements b for receiving detection beams such as infrared rays (IR) transmitted from the transmitters 1A and 1B. The receivers 2A and 2B are disposed one above the other. In the present embodiment, the receiver 2A is disposed above the receiver 2B.

The transmission section 1 and the reception section 2 are respectively accommodated in a main unit case 16, and are mounted on respective support structures K such as, for example, poles or building walls. The object detection device D detects, when, for example, an infrared ray (IR) from the transmitter 1A is intervened, an object according to change of a signal level of a detection signal received by the receiver 2A that opposes the transmitter 1A.

The transmitters 1A and 1B, and the receivers 2A and 2B, respectively, have angle adjustment mechanisms, having the same structure, each of which adjusts an optical axis (angle) of a detection unit (optical system) based on a level of a detection signal. In the adjustment of the optical axis, a coarse adjustment for adjusting a direction of the optical axis of the detection unit, is firstly performed, and a fine adjustment is performed for optimizing the condition of the optical axis so as to obtain a detection signal level indicating a value greater than or equal to a predetermined value. In this case, the transmission section 1 and the reception section 2 have communication functions, which are not shown, and the transmitters 1A and 1B adjust optical axes based on levels of detection signals transmitted from the receivers 2A and 2B. It is to be noted that, when the object detection device does not have the transmission and reception functions as described above, optical axes are manually adjusted for the transmitters 1A and 1B, and the receivers 2A and 2B adjust optical axes based on levels of the detection signals. Hereinafter, a structure of each of the transmitters and the receivers will be described by using the receiver 2A as a representative of them.

Figure 1B:
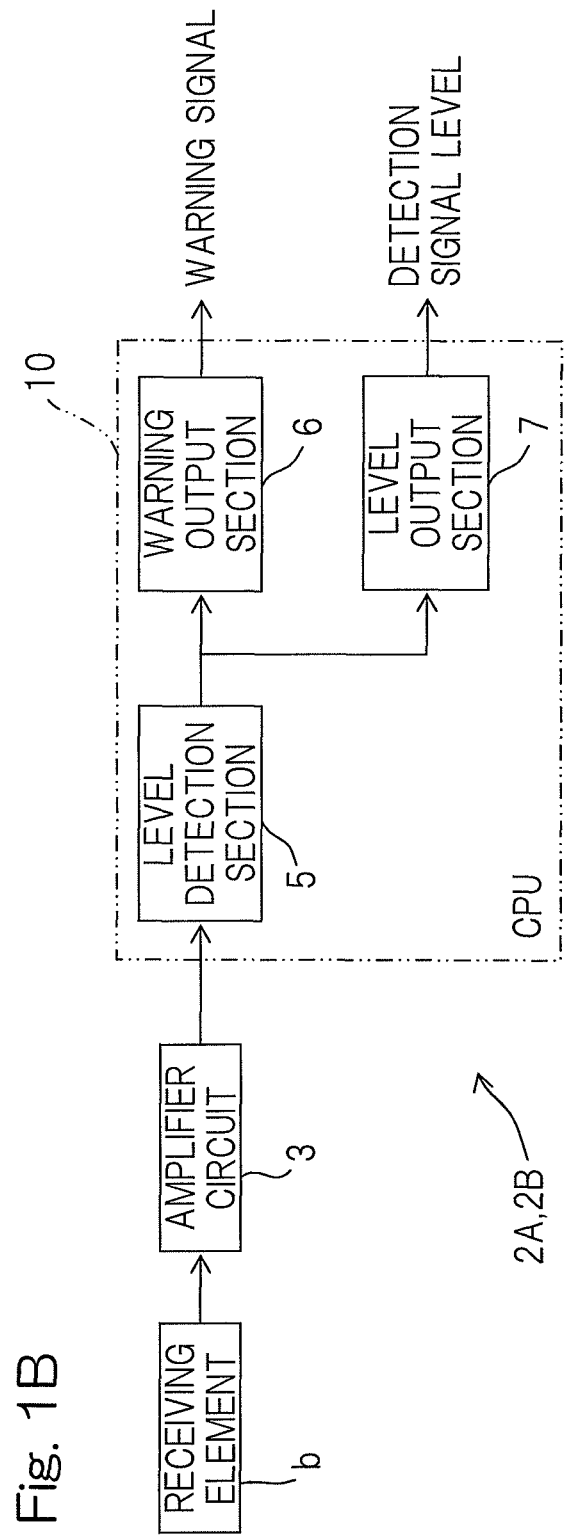
FIG. 1B illustrates a structure of a receiver shown in FIG. 1A.

FIG. 1B illustrates a structure of the receiver 2A. In a control section (CPU) 10 for controlling the entirety of the receiver 2A, an electrical signal (detection signal) outputted by the reception element b according to an amount of detection beams received from the transmitter 1A is amplified by an amplifier circuit 3, and a signal intensity of the amplified signal, that is, an amount of change of infrared rays, is constantly monitored by level detection section 5. The level detection section 5 detects a detection signal level of an inputted electrical signal. Warning output section 6 outputs a warning signal when the detection signal level indicates a value less than or equal to a reference value for object detection. Level output section 7 outputs the detection signal level to the external unit.

Figures 2A, 2B:
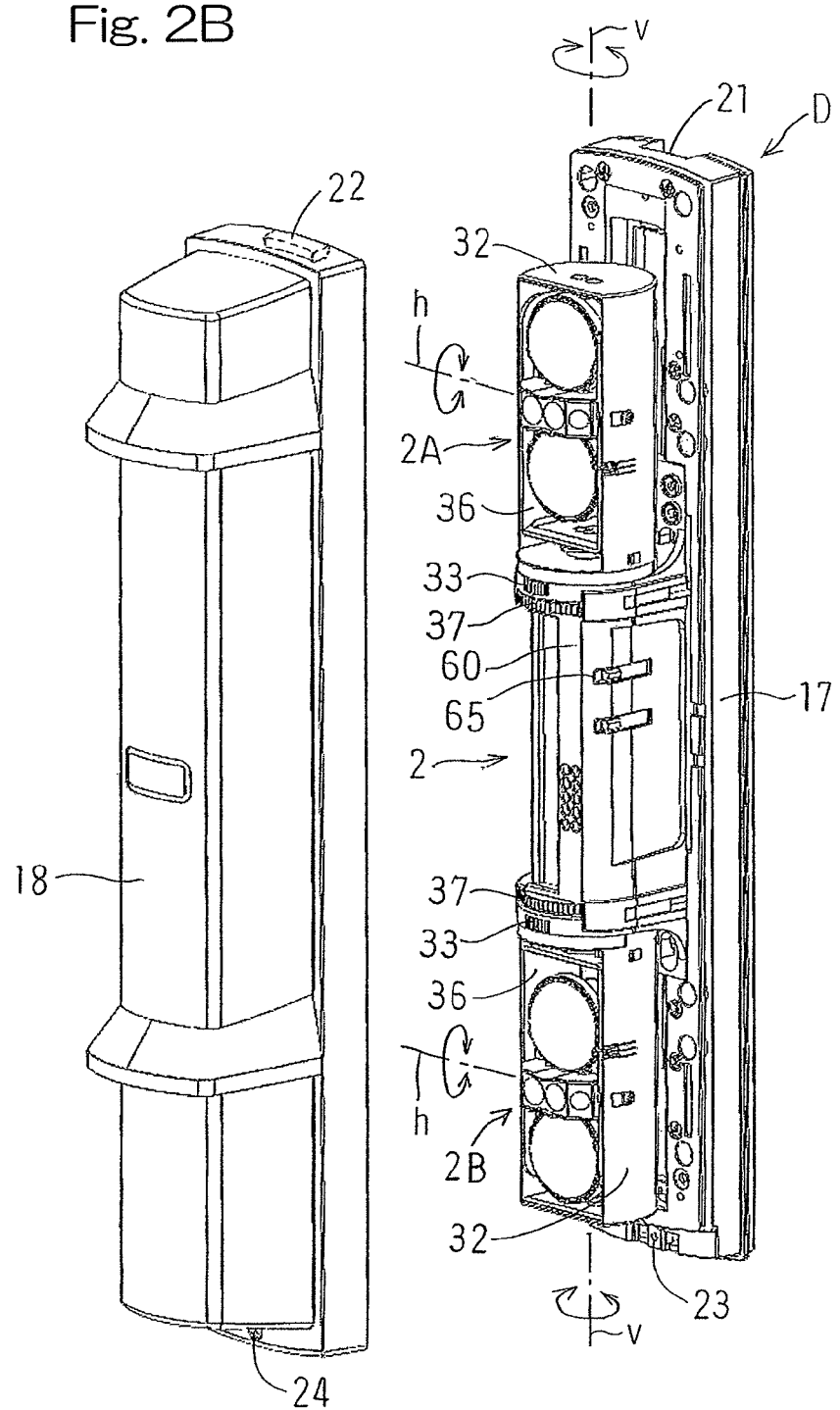
FIG. 2A is a perspective view illustrating a state in which a cover of a reception section of the object detection device shown in FIG. 1 is removed.
FIG. 2B is a perspective view of the cover of the reception section.

FIG. 2A is a perspective view illustrating a state in which a cover of the reception section 2 of the object detection device D having the angle adjustment mechanism is removed, and FIG. 2B is a perspective view of the cover. As shown in FIG. 2A, the receiver 2A and the receiver 2B disposed on the upper and lower portions are held by a fixing holder 60, and are fixed onto a chassis 17 having a vertically elongated flat plate shape. The main unit case 16 of the reception section 2 is structured to include the chassis 17 shown in FIG. 2A, and a cover 18, shown in FIG. 2B, which is formed of a resin and covers the chassis 17. A stepped engagement portion 21 of the chassis 17 is engaged with an engagement projection 22 in the upper portion of the cover 18, and a fixing screw 24 in the lower portion of the cover 18 is screwed into a screw hole 23 of the chassis 17, to connect the chassis 17 and the cover 18 with each other. A casing of the device is formed by the fixing holder 60 and the chassis 17. The level output section 7 has an output terminal 65 provided on the fixing holder 60.

In the present embodiment, the reception section 2 has the receivers 2A and 2B integrated with each other by section of the holder 60 such that the receiver 2A is disposed above the receiver 2B. However, the receivers 2A and 2B may be disposed one above the other so as to be separated from each other. Alternatively, one of the receiver 2A or the receiver 2B may be disposed. The same applies to the transmitter 1.

Figure 3:
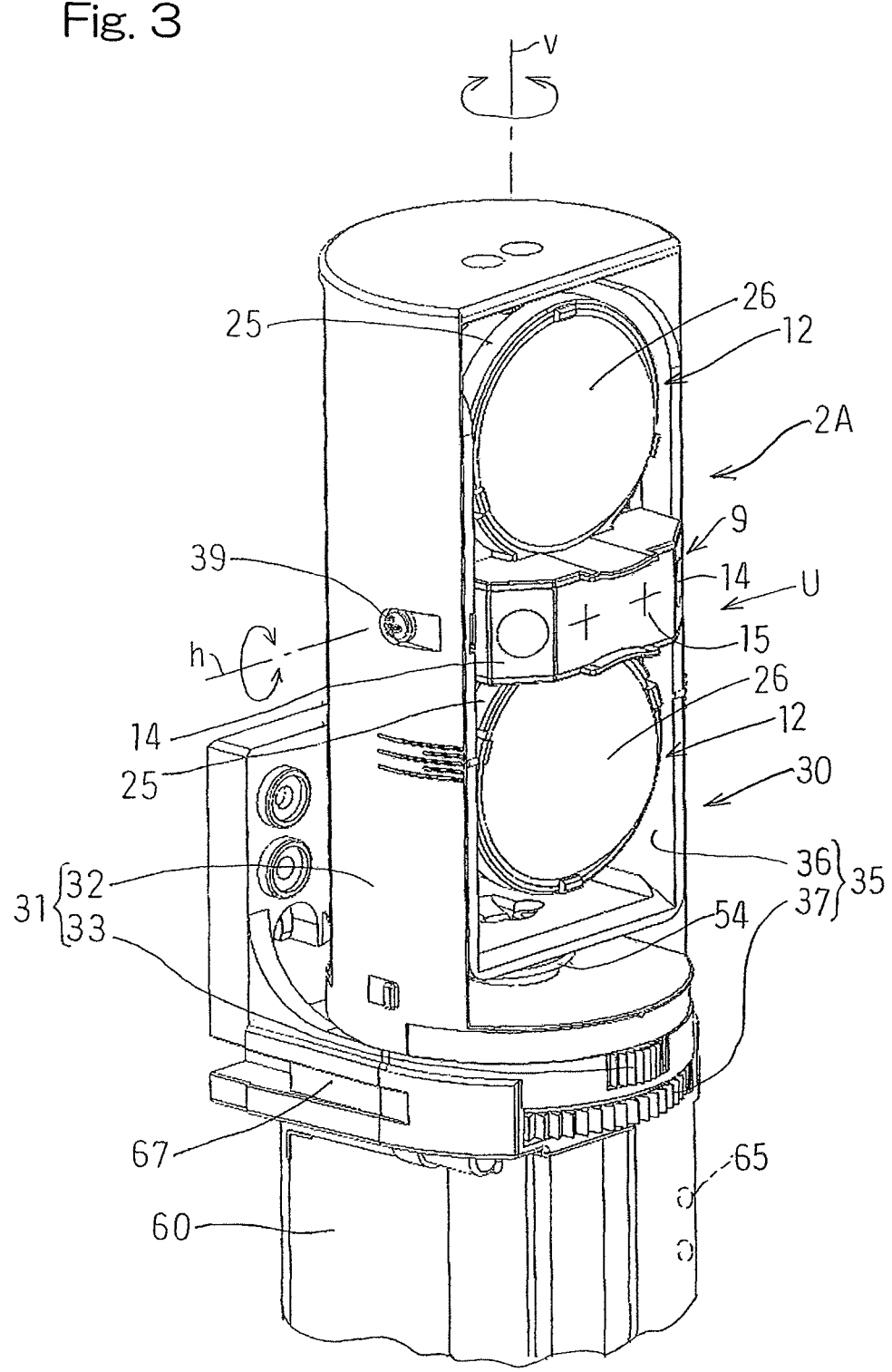
FIG. 3 is a perspective view of the receiver.
Figure 4:
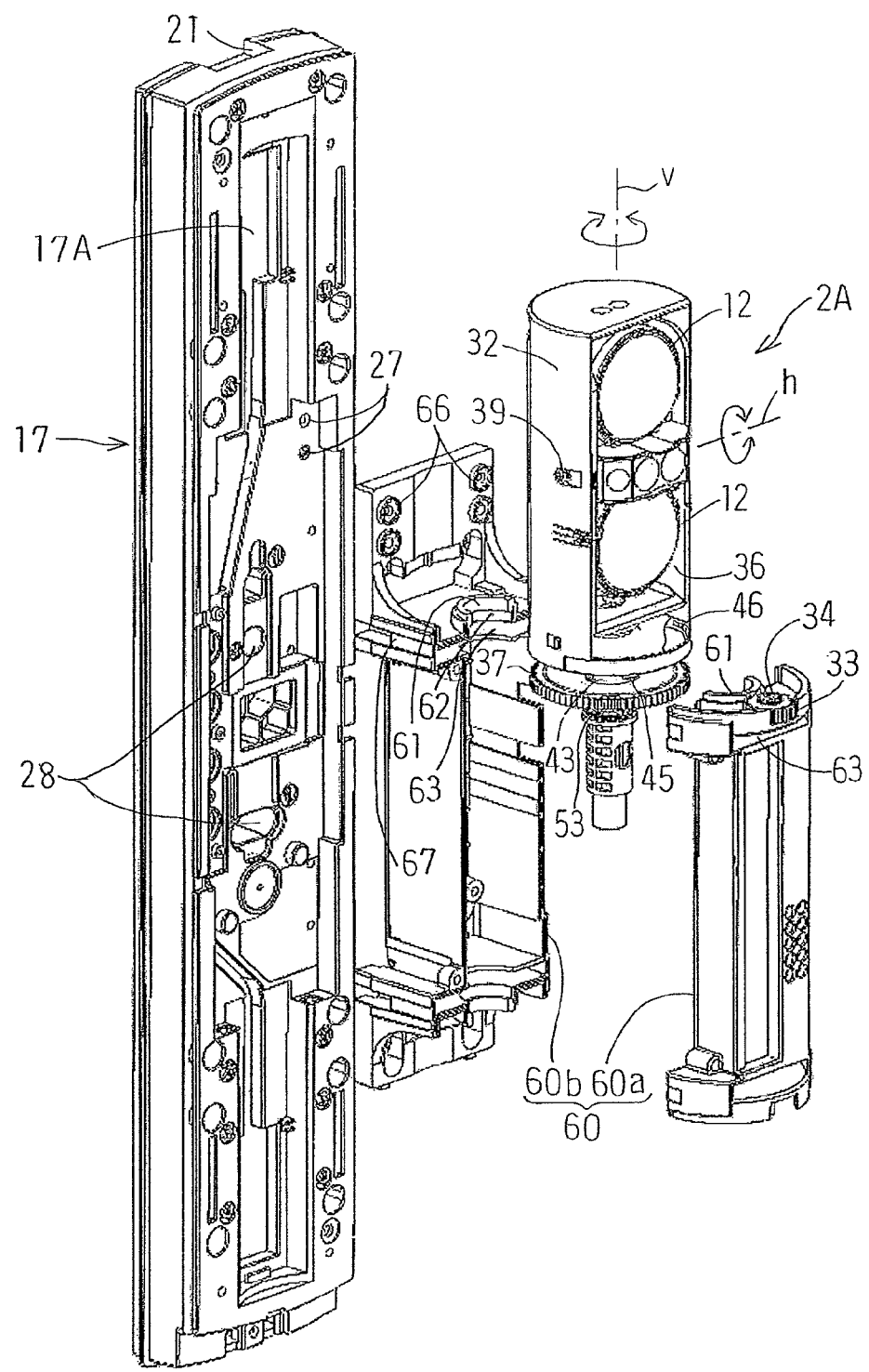
FIG. 4 is an exploded view illustrating a state in which the receiver is mounted.
Figure 5:
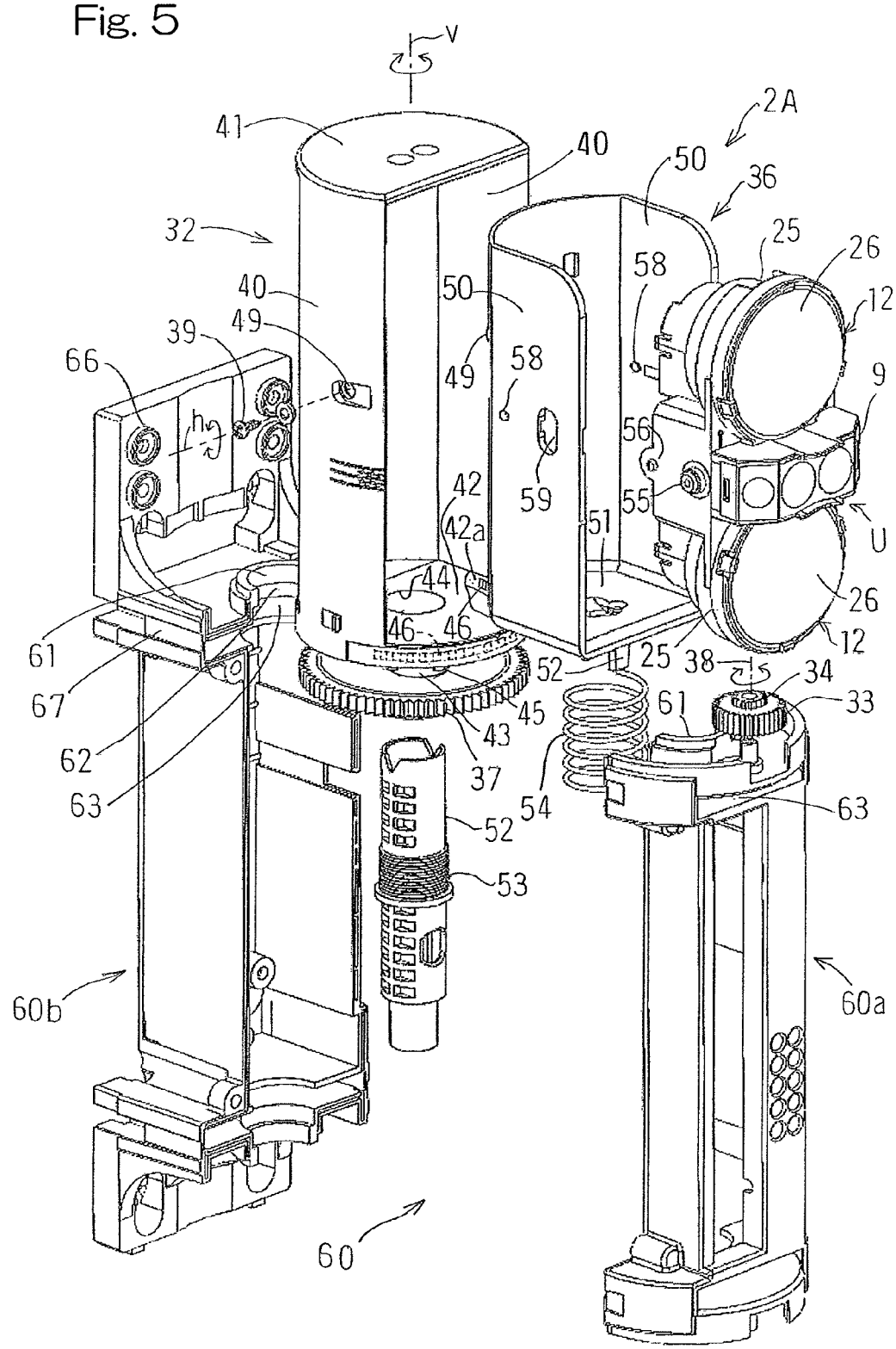
FIG. 5 is an exploded view of the receiver.

FIG. 3 is a perspective view of the receiver 2A. FIG. 4 is an exploded view illustrating a state in which the receiver 2A is mounted. FIG. 5 is an exploded view of the receiver 2A. As shown in FIG. 3, in the receiver 2A, the receiving elements b (FIG. 1A) are each accommodated inside a holding component 25 having a bottom and a roughly cylindrical shape, and a lens 26 is fitted into and secured to the front surface portion of the holding component 25. Receiving optical systems (detection units) 12 of the receiver 2A are each formed by the receiving element b and the lens 26. Similarly, transmitting optical systems (detection units) 11 of the transmitter 1A are each formed by the transmitting element a and the lens 26 (FIG. 1A).

An angle adjustment mechanism 30 of the receiver 2A has a horizontal angle adjustment section 31 for adjusting a horizontal angle of each optical system 12 rotatable about a vertical axis, and a vertical angle adjustment section 35 for adjusting a vertical angle of each optical system 12 rotatable about a horizontal axis. The horizontal angle adjustment section 31 includes: a horizontal rotation component 32 formed as a rotation holder that rotates and drives each optical system 12 in the horizontal direction; and a horizontal adjustment-engagement member 33, such as a horizontal adjustment dial, that is engaged with the rotation holder 32, rotates so as to drive the rotation holder 32, with which an automatic angle adjustment unit (FIG. 6) is externally engageable, which will be described below. The vertical angle adjustment section 35 includes: a vertical rotation component 36 formed as a conrod that rotates and drives each optical system 12 in the vertical direction; and a vertical adjustment-engagement member 37, such as a vertical adjustment dial, that is engaged with the conrod 36, rotates so as to drive the conrod 36, with which the automatic angle adjustment unit is externally engageable.

The optical systems 12 are accommodated in the conrod 36 acting as the vertical rotation component. The conrod 36 is accommodated in the rotation holder 32 such that the conrod 36 is supported by a pivot 39 provided at each of the center portions in the vertical direction, so as not to horizontally rotate relative to the rotation holder 32 acting as the horizontal rotation component, and so as to be vertically movable relative to the rotation holder 32. The lens 26 of each optical system 12 is exposed on the front surface of the conrod 36 and the rotation holder 32. The rotation holder 32 is supported by the fixing holder (casing of the device) 60 so as to be horizontally rotatable.

The horizontal adjustment dial 33 and the vertical adjustment dial 37 each have knurled surfaces, for example, in the form of external gear. When automatic angle adjustment is performed by the automatic angle adjustment unit 70 attached to the fixing holder 60 from the exterior thereof as described below, the horizontal adjustment dial 33 and the vertical adjustment dial 37 are engaged with gears 72 and 73, respectively, of an automatic angle adjustment unit 70, and the dials 33 and 37 are rotated to perform a fine adjustment of the optical axes. In the coarse adjustment, the dials 33 and 37 are manually rotated. It is to be noted that the dials 33 and 37 may be formed as rubber rollers instead of knurled surfaces.

As shown in FIG. 4, the receiver 2A is held at the lower portion thereof by the fixing holder 60. The fixing holder 60 is divided into a front portion and a rear portion as a first half portion 60a and a second half portion 60b in the anteroposterior direction. The fixing holder 60 has at the center of the direction a through hole 61 extending therethrough so as to allow a cylindrical portion 43 of the rotation holder 32 to horizontally rotate. A plurality (in the present embodiment, two) of projections 45 are provided on the outer circumferential surface of the cylindrical portion 43 so as to be spaced from each other in the circumferential direction. The projections 45 are accommodated in circumferential groove portions 62 formed in the through hole 61 of each of the first and the second half portions 60a and 60b, thereby preventing the rotation holder 32 from moving along the axial direction (upward and downward direction). The fixing holder 60 has an accommodation section 63 formed for accommodating the vertical adjustment dial 37 so as to be horizontally rotatable.

In the first half portion 60a of the fixing holder 60, the horizontal adjustment dial 33 is exposed on the front surface, and is held so as to be horizontally rotatable. In the second half portion 60b, groove portions 67 into which clamping section 76 of the automatic angle adjustment unit 70 fits from the exterior of the object detection device D, are formed on both outer side portions of the second half portion 60b. The half portions 60a and 60b are fastened and connected to each other by section of a plurality of screws which are not shown. The fixing holder 60 is secured to the chassis 17 by screws being screwed into screw holes 27 of the chassis 17 through screw holes 66. The back surface portion of the conrod 36 of the receiver 2A is accommodated in a recess 17A of the chassis 17. Further, the chassis 17 has a plurality of mounting holes 28, and is screwed to mount and secure to the mounting portion K through the mounting holes 28.

The rotation holder 32 of the horizontal angle adjustment section 31 shown in FIG. 3 has a roughly cylindrical shape, has an upper lid 41 and a bottom wall 42, and has a front surface opened, as shown in FIG. 5. To the bottom wall 42, the cylindrical portion 43 (having a vertical axis v) projecting downward is connected, and a through hole 44 is formed so as to penetrate through the center portion of the bottom wall 42 and the center portion of the cylindrical portion 43. The vertical axis v is an axis along the longitudinal direction of the object detection device D, and is the axis of rotational movement obtained by the horizontal adjustment dial 33.

Both side portions 40 of the rotation holder 32 each have formed therein a screw hole 49 into which the pivot (having a horizontal axis h) formed as an external or a male screw 39 for supporting the conrod 36 so as to be rotatable, is screwed. The horizontal axis h is an axis that is orthogonal to the longitudinal direction of the object detection device D, and is the axis of rotational movement obtained by the vertical adjustment dial 37.

At the center of each side surface of an optical unit U having the two optical systems 12 (detection unit) and a sighting device 9, an internal or a female screw thread portion 55 and a projection 56 positioned at the rear of the internal screw thread portion 55 are formed so as to project outward. On both side portions 50 of the conrod 36, horizontally elongated holes 58 that horizontally extend in the rear portion, and vertically elongated holes 59 that vertically extend in the front portion, are formed. The projections 56 of the optical unit U are fitted into the horizontally elongated holes 58 of the conrod 36 so as to be rotatable, and the external screws (the pivots) 39 are screwed into the internal screw thread portions 55. Thus, the optical unit U is movable upward and downward in the vertically elongated holes 59 in a state where the conrod 36 is held by the rotation holder 32.

A shaft portion 52 projecting downward from a bottom portion 51 of the conrod 36 is inserted through the through hole 44 into the cylindrical portion 43 so as to be movable upward and downward. The bottom wall 42 of the rotation holder 32 protrudes upward, and an internal gear 46 is formed on an inner circumferential surface 42a of the bottom wall 42 along the circumferential direction.

The horizontal adjustment dial 33 is mounted to the fixing holder 60 so as not to move upward and downward relative thereto, and so as to be horizontally rotatable relative thereto. In this state, the horizontal adjustment dial 33 is disposed below the rotation holder 32. A portion of the front surface of the horizontal adjustment dial 33 is exposed from the fixing holder 60. The horizontal adjustment dial 33 can be manually operated when a coarse adjustment is performed. The automatic angle adjustment unit 70 (FIG. 6) can engage with the horizontal adjustment dial 33 from the exterior and the horizontal adjustment dial 33 is automatically driven when a fine adjustment is performed. It is to be noted that the fine adjustment can also be manually performed.

The horizontal adjustment dial 33 rotates about an axis 38 which is parallel to the cylindrical portion 43 of the rotation holder 32. The rotation holder 32 for supporting the conrod 36 having the optical unit U incorporated therein is rotated about the vertical axis v in conjunction with the rotation of the dial 33. Namely, a drive gear 34 which is formed as an external gear at the center portion of the top surface of the dial 33, and the following gear 46 which is formed as an internal gear on the bottom wall inner circumferential surface 42a of the rotation holder 32 are engaged with each other, and the rotation holder 32 rotates about the vertical axis v to change the horizontal angle according to the rotation of the horizontal adjustment dial 33.

The conrod 36 of the vertical angle adjustment section 35 shown in FIG. 3 has a roughly cylindrical shape having a bottom, has its front surface opened, has the shaft portion 52 projecting downward from the bottom portion 51, and has an external screw portion 53 formed at the center portion of the shaft portion 52, as shown in FIG. 5.

The shaft portion 52 of the conrod 36 is inserted into the through hole 44 of the rotation holder 32 so as to be movable upward and downward, and a coil spring 54 is interposed, at the outer circumference of the shaft portion 52, between the bottom surface of the bottom portion 51 of the conrod 36 and the top surface of the bottom wall 42 of the rotation holder 32, to apply an upward spring force to the conrod 36. The external screw portion 53 of the shaft portion 52 of the conrod 36 is screwed with an internal screw formed in a through hole at the center of the vertical adjustment dial 37.

The vertical adjustment dial 37 is mounted to the fixing holder 60 so as not to move upward and downward relative thereto, and so as to be horizontally rotatable relative thereto. In this state, the vertical adjustment dial 37 is disposed below the rotation holder 32. A portion of the front surface of the vertical adjustment dial 37 is exposed from the holder 60. The vertical adjustment dial 37 can be manually operated when a coarse adjustment is performed. The automatic angle adjustment unit 70 (FIG. 6) can engage with the vertical adjustment dial 37 from the exterior and the vertical adjustment dial 37 is automatically driven when a fine adjustment is performed. It is to be noted that the fine adjustment can be manually performed.

Since the conrod 36 is prevented from horizontally rotating relative to the rotation holder 32 by section of the pivots 39, the rotation of the vertical adjustment dial 37 is transformed into a reciprocating movement of the shaft portion 52 in the axial direction, and the conrod 36 is pivotably supported by the pivots 39 of the rotation holder 32. Thus, since a distance between the internal screw thread portion 55 that projects and penetrates through the vertically elongated hole 59, and the projection 56 that penetrates through the horizontally elongated hole 58 is maintained, when, according to movement of the shaft portion 52 in the axial direction, a state in which the internal screw thread portion 55 is positioned at the center of the vertically elongated hole 59 shifts to a state in which the vertically elongated hole 59 is moved in the longitudinal direction relative to the internal screw thread portion 55, the projection 56 is moved in the longitudinal direction of the horizontally elongated hole 58, so that the optical unit U in the conrod 36 having the shaft portion 52 is tilted, and rotates about the pivot 39 corresponding to the central axis, that is, about the horizontal axis h. Thus, the angle of each optical system 12 of the optical unit U to the vertical axis is adjusted. Namely, the optical systems 12 are set so as to be tiltable relative to the horizontal axis h by section of a cranking mechanism including the vertical adjustment dial 37, the pivots 39, the shaft portion 52, the internal screw thread portions 55, the projections 56, the horizontally elongated holes 58, and the vertically elongated holes 59.

Further, the receiver 2A shown in FIG. 3 includes the sighting device 9 for a coarse adjustment of the optical axis. The sighting device 9 includes: a pair of right and left observation windows 14 for allowing observation from the side surface sides of the receiver 2A; a marking 15 formed on the front surface; a mirror (not shown) which reflects the transmitter 1A shown in FIG. 1A; an objective lens and an eyepiece having a microlens (not shown). For adjusting the optical axis, the horizontal angle adjustment dial 33 and the vertical angle adjustment dial 37 are manually rotated to adjust a direction of the optical axis with observation through the observation windows 14. In a case where the automatic angle adjustment unit 70 has a GPS function incorporated therein as described below, since a coarse adjustment can be performed by using mounting-position information, the sighting device 9 may be unnecessary.

According to the present invention, the horizontal angle adjustment dial 33 and the vertical angle adjustment dial 37 are positioned adjacent to each other at fixed positions such that portions thereof are exposed on the front surface of the device. Therefore, according to the present invention, a position of the vertical adjustment dial 37 is fixed regardless of a position to which the rotation holder (horizontal rotation component) 32 is rotated, which is different from the conventional art in which a position of the vertical adjustment dial is changed depending on a position to which the horizontal rotation component is rotated. Therefore, engagement of the automatic angle adjustment unit 70 is facilitated. Further, according to the present invention, since the horizontal angle adjustment dial 33 and the vertical angle adjustment dial 37 are positioned adjacent to each other, the automatic angle adjustment unit 70 can be attached to and detached from each adjustment-engagement member with ease. Further, since the automatic angle adjustment unit 70 is externally provided, increase of the size of the object detection device can be restrained. Further, since the horizontal adjustment dial 33 and the vertical adjustment dial 37 are positioned so as to rotate about the vertical axes, the automatic angle adjustment unit 70 can easily engage with from the exterior and drive both the adjustment dials 33 and 37, and attachment and detachment thereof are performed with enhanced ease. Since the horizontal angle adjustment dial 33 and the vertical angle adjustment dial 37 are positioned adjacent to each other on the front surface, manual operation is also facilitated.

Figure 6:
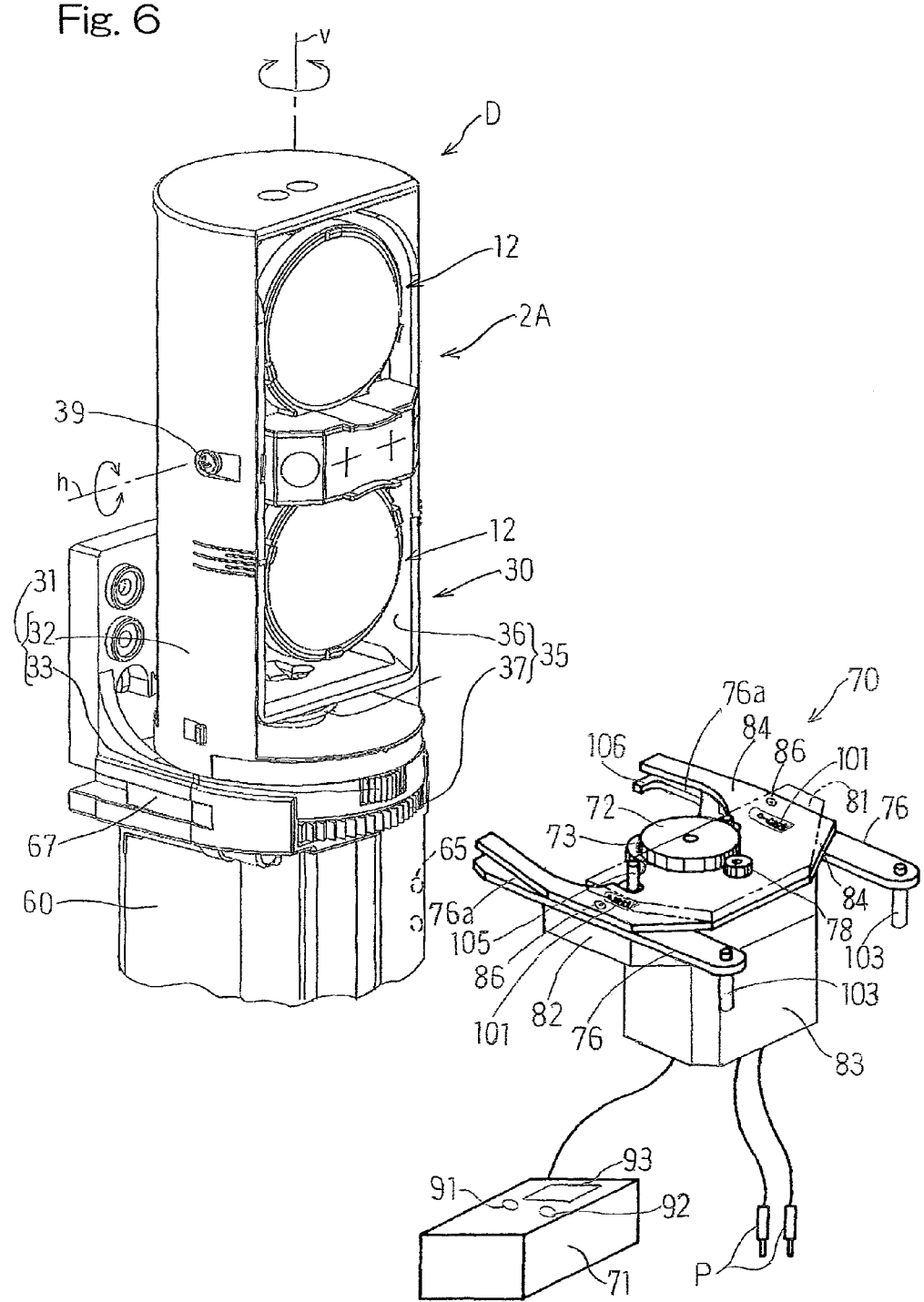
FIG. 6 is a perspective view of an object detection system including an automatic angle adjustment unit according to a second embodiment of the present invention.
Figure 7:
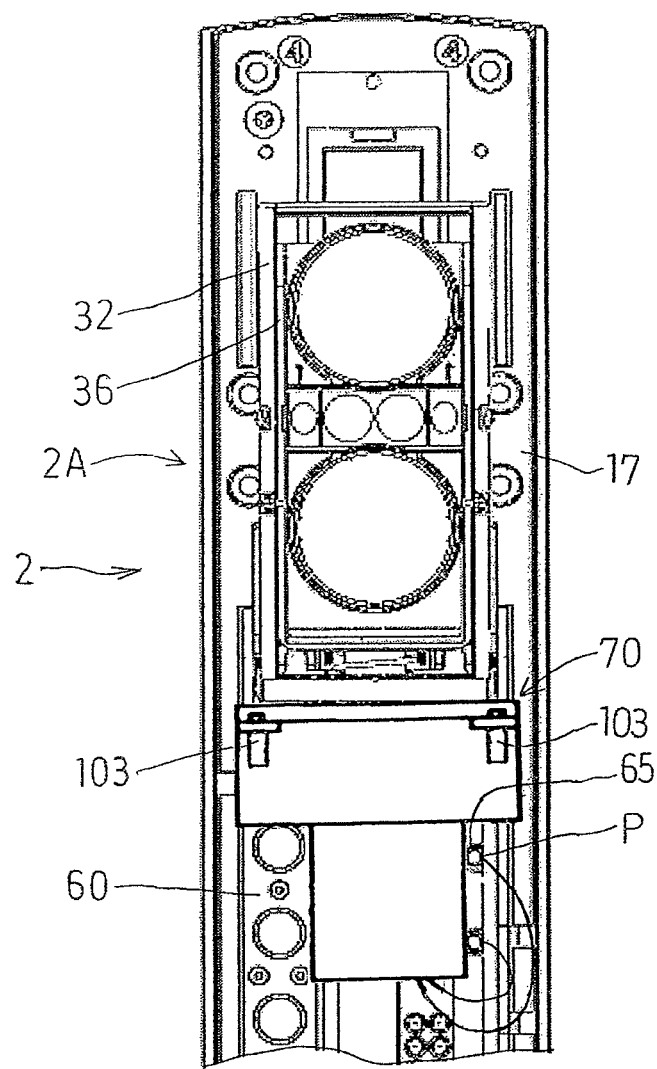
FIG. 7 is a front view illustrating a state in which the automatic angle adjustment unit is attached to the receiver.

FIG. 6 is a perspective view of an object detection system according to a second embodiment of the present invention. The object detection system includes: the automatic angle adjustment unit 70 that is engaged with the angle adjustment mechanism 30 of the receiver 2A of the object detection device D, and that adjusts an angle of the optical system 12 to the horizontal axis and an angle of the optical system 12 to the vertical axis, to automatically adjust the optical axis from the exterior of the device; and a control box 71 for controlling the automatic angle adjustment unit 70, in addition to the object detection device D. The control box 71 includes a probe P for input of a detection signal level. The automatic angle adjustment unit 70 includes: engagement-drive transmission sections 72 and 73 acting as horizontal and vertical adjustment gears that removably engage with the horizontal and the vertical adjustment dials 33 and 37 of the angle adjustment mechanism 30 of the receiver 2A, from the front surface, with ease, and drive the horizontal and the vertical adjustment dials 33 and 37, respectively; and clamping section 76 that is a pair of arm components for fixing the automatic angle adjustment unit 70 to the receiver 2A in a state where the engagement-drive transmission sections 72 and 73 engage with the horizontal and the vertical adjustment dials 33 and 37. FIG. 7 illustrates a state in which the automatic angle adjustment unit 70 is fixed to the receiver 2A.

Figure 8:
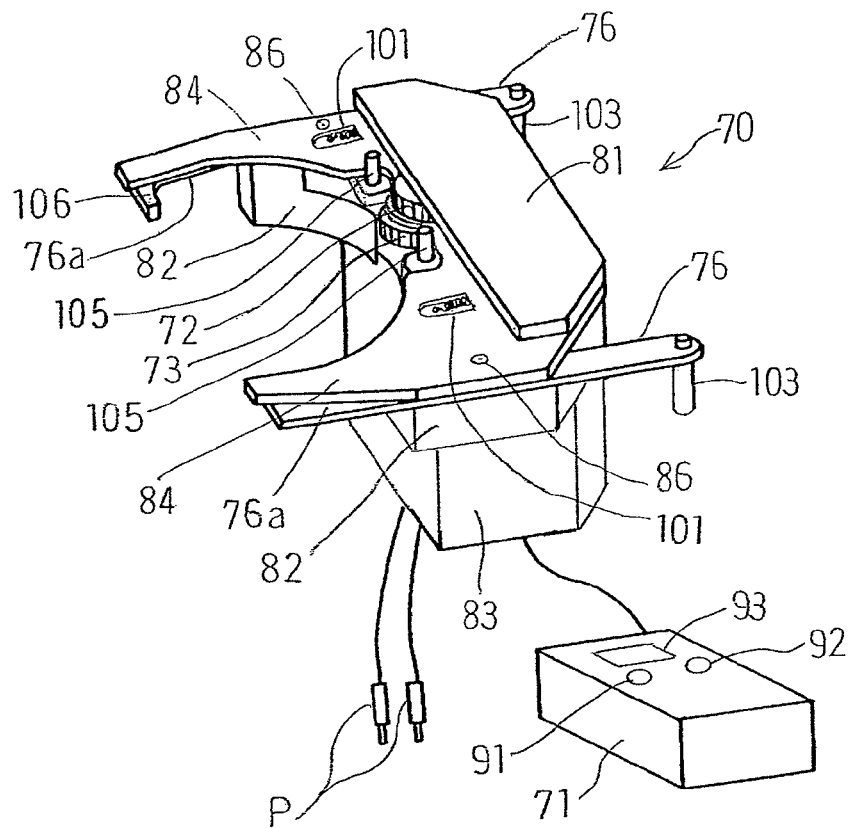
FIG. 8 is a perspective view of the automatic angle adjustment unit.
Figure 9:
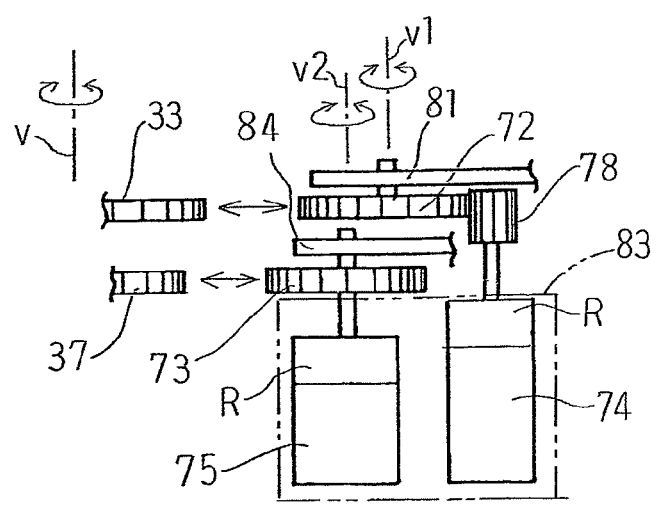
FIG. 9 is a plan view of an internal structure of the automatic angle adjustment unit.
Figure 10A:
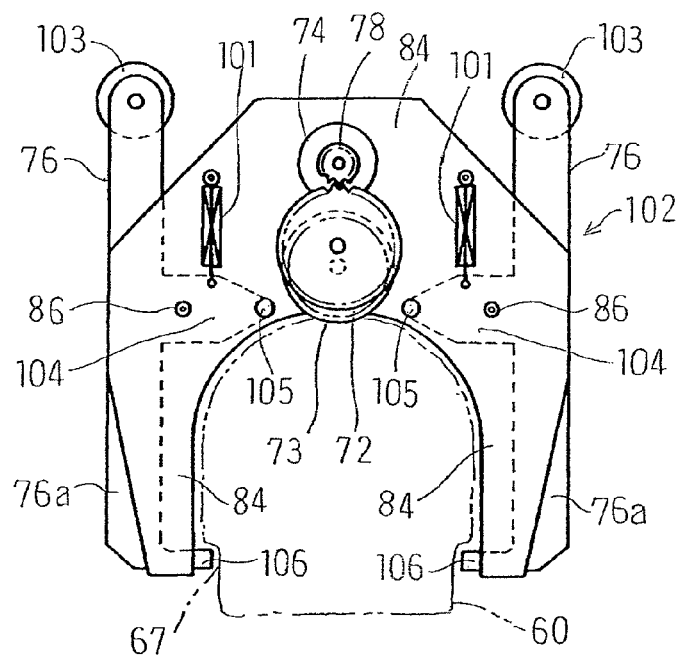
FIG. 10A is a plan view of the internal structure of the automatic angle adjustment unit.
Figure 10B:
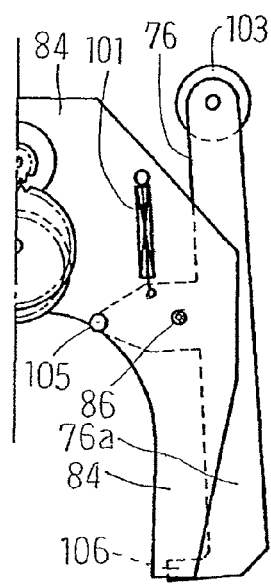
FIG. 10B is a plan view of the internal structure of the automatic angle adjustment unit.

FIG. 8 is a perspective view of the automatic angle adjustment unit 70. FIG. 9 is a schematic side view of a gear mechanism thereof. FIG. 10A and FIG. 10B are each a plan view of an internal mechanism thereof. As shown in FIG. 8, the automatic angle adjustment unit 70 includes: a lid portion 81 having a trapezoidal shape in a planar view; a base 82 which is roughly U-shaped; and a gear case 83 which is box-shaped. The horizontal adjustment gear 72 is mounted onto the bottom surface of the lid portion 81 so as to be horizontally rotatable (FIG. 10A). The clamping section 76, which is implemented as a pair of arm components, is provided, between the lid portion 81 and the base 82, for fixing the unit 70 to the receiver 2A in a state where the horizontal adjustment gear 72 and the vertical adjustment gear 73 respectively engage with the horizontal adjustment dial 33 and the vertical adjustment dial 37 (FIG. 9). The pair of arm components 76 is mounted onto the arm mounting plate 84 between the base 82 and an arm mounting plate 84 such that each arm component is pivotally supported by the arm mounting plate 84 so as to be horizontally rotatable on a pivot 86. The vertical adjustment gear 73 is mounted onto the bottom surface of the arm mounting plate 84 so as to be horizontally rotatable (FIG. 10A). Motors 74 and 75, each of which has a decelerator R, for driving the horizontal adjustment gear 72 and the vertical adjustment gear 73 shown in FIG. 10A are attached and mounted in the gear case 83.

As shown in FIG. 9, the horizontal adjustment gear 72 mounted to the lid portion 81 is provided with a driving gear 78 that operates with rotation of the horizontal adjustment gear 72 about a vertical axis v1. The driving gear 78 is driven by driving section 74 which is implemented as the motor having the decelerator R. The vertical adjustment gear 73 which is mounted to the arm mounting plate 84 and rotates about a vertical axis v2 is driven by driving section 75 which is implemented as the motor having the decelerator R. The horizontal adjustment dial 33 and the vertical adjustment dial 37 which mesh with the horizontal adjustment gear 72 and the vertical adjustment gear 73, respectively, are rotated by the horizontal adjustment gear 72 and the vertical adjustment gear 73 being driven.

As shown in FIG. 10A, the arm components 76 paired each have a handle portion 103 provided at a rear end, and a projection 104 provided at the center so as to project inward. The projection 104 has, at the head, a kickout component 105 which is rod-shaped. Further, the arm components 76 each have a hooking portion 106 at an arm front end 76a. The rear end of the projection 104 is supported so as to be rotatable on the pivot 86. Spring components 101 each have one end fixed to the arm mounting plate 84 in an engaged state, and has the other end fixed to the upper end of the projection 104 in an engaged state. An upward spring force is applied to the projection 104 to press the arm front end 76a inwardly. The engagement grooves 67, 67 are formed on the outer surfaces of both side walls of the fixing holder 60 shown in FIG. 6, and the inner side surface of the arm front end 76a and the hooking portion 106 are fitted into each engagement groove 67.

The arm components 76 paired each have an ejection member which includes the projection 104 having the kickout component 105 formed at the head for pushing the fixing holder 60 and smoothly disengaging the horizontal adjustment gear 72 and the vertical adjustment gear 73 from the horizontal adjustment dial 33 and the vertical adjustment dial 37, respectively, when clamping onto the fixing holder 60 of the receiver 2A is canceled.

In FIG. 10B, each arm front end 76a is spread outwardly by pressing each handle portion 103 inwardly with fingers against the spring force of each spring component 101 so as to narrow a distance between the handle portions 103, and the arm front ends 76a, 76a are caused to approach the engagement grooves 67, 67 on both of the side walls of the fixing holder 60 of the receiver 2A. Then, by releasing the fingers from the handle portions 103, each arm front end 76a is moved inwardly so as to narrow a distance between the arm front ends 76a, 76a as shown in FIG. 10A, the arm front ends 76a, 76a are fitted into the engagement grooves 67, 67, and the hooking portions 106 are engaged with the back surfaces of the corner portions of the engagement grooves 67, 67. In this manner, the unit 70 is mounted and fixed to the fixing holder 60.

In FIG. 10B, in each ejection section 102, when each arm front end 76a is spread outwardly by pressing each handle portion 103 inwardly with fingers against the spring force of each spring component 101 so as to narrow a distance between the handle portions 103, the hooking portions 106 are removed from the engagement grooves 67, 67, the projections 104 rotate inwardly, the kickout components 105 at the head thereof abut against the outer surface of the fixing holder 60, and the unit 70 is horizontally pushed off the adjustment dials 33 and 37. In this manner, the unit 70 is removed from the fixing holder. Thus, the horizontal adjustment gear 72 and the vertical adjustment gear 73 are moved from the horizontal adjustment dial 33 and the vertical adjustment dial 37 in a disengaging direction, and the disengagement can be smoothly performed without rubbing the engaged portions. Therefore, when the unit 70 is removed, deviation of angles having been set can be prevented from occurring in the horizontal adjustment dial 33 and the vertical adjustment dial 37.

Figure 11:
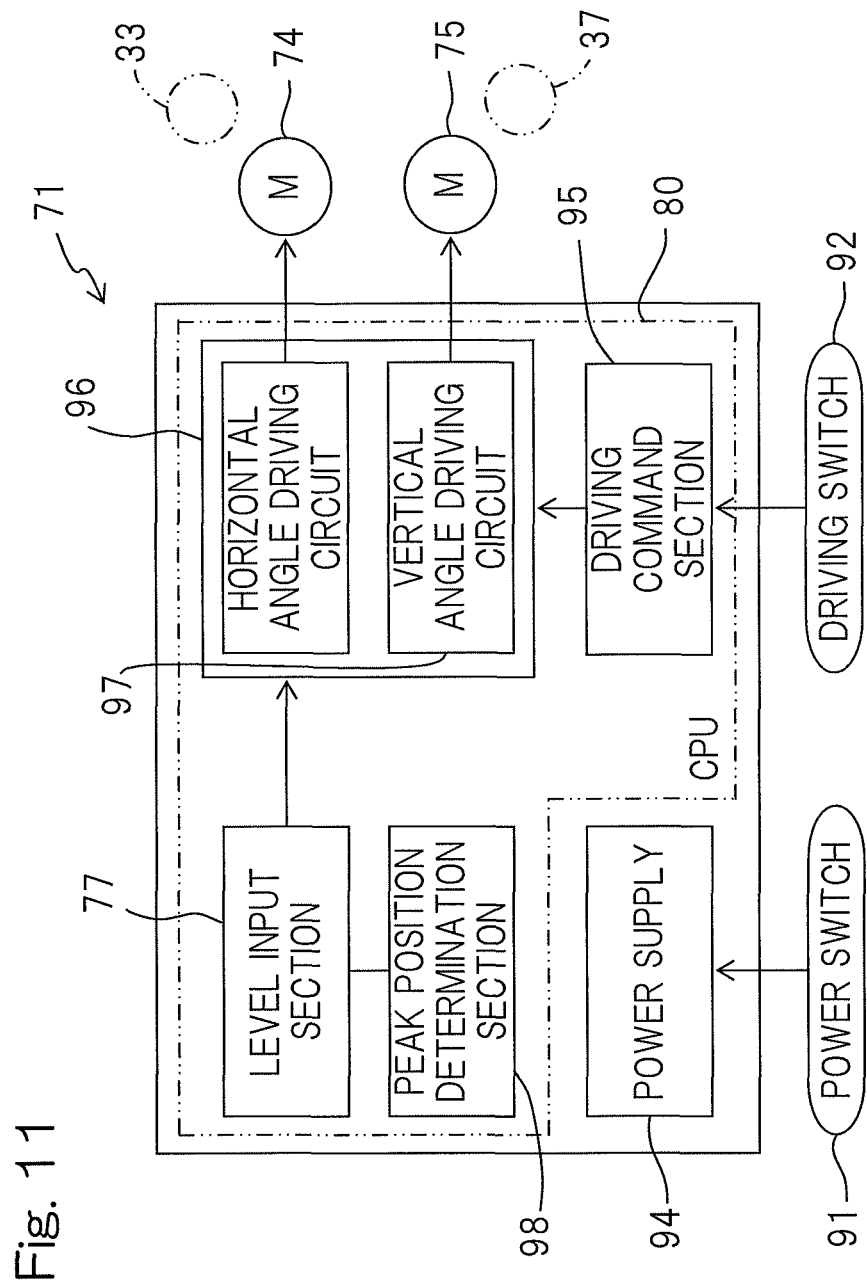
FIG. 11 illustrates an electrical system of the automatic angle adjustment unit.

On the top surface of the control box 71 shown in FIG. 11, a power switch 91, a driving switch 92, and a voltage value indicator 93 for indicating a voltage value of the detection signal level, are provided. In the control box 71, a power supply 94, such as a battery, for supplying power, and an adjustment unit control section (CPU) 80 are provided.

FIG. 11 illustrates a structure of an electrical system in the control box 71. The adjustment unit control section (CPU) 80 controls the entirety of the unit, and performs a control for driving, by driving the motors 74 and 75, the horizontal adjustment dial 33 and the vertical adjustment dial 37 via the horizontal adjustment gear 72 and the vertical adjustment gear 73 based on a detection signal level. The adjustment unit control section (CPU) 80 includes: level input section 77 for receiving a detection signal level inputted from the probe P; driving command section 95 for outputting a driving command, from the driving switch 92, for driving; an horizontal angle driving circuit 96 for driving the motor 74 based on the instruction for driving; an vertical angle driving circuit 97 for driving the motor 75 based on the instruction for driving; and peak position determination section 98 for determining a peak position of the detection signal level. The horizontal and vertical adjustment dials 33 and 37 are stopped at a position corresponding to the determined peak position of the detection signal level, and the horizontal angle of each optical system 12 and the vertical angle of each optical system 12 are set for the object detection device.

Thus, according to the present invention, the automatic angle adjustment unit is removably engaged with the horizontal adjustment-engagement member and the vertical adjustment-engagement member of the object detection device from the front surface with ease, and drives the adjustment-engagement members from the exterior of the device, to adjust the horizontal angle and the vertical angle of each optical system. Therefore, the size and cost are reduced, the attachment and the detachment are facilitated, and the automatic angle adjustment can be performed from the exterior of the device with ease.

Hereinafter, an operation of the object detection system that includes the object detection device D and the automatic angle adjustment unit 70 as described above will be described. Each of the receiver 2A and the receiver 2B disposed on the upper portion and the lower portion includes the optical systems 12 as shown in FIG. 3. Therefore, in a case where a fine adjustment of an optical axis is performed after a coarse adjustment of the optical axis by a visual observation as described above, optical systems other than the optical system for which optical axes are adjusted, are previously covered with a light shielding plate (not shown). In the present embodiment, since the transmitters 1A and 1B, and the receivers 2A and 2B each include the angle adjustment mechanism, the optical axis adjustment is independently performed for each of the transmitters and the receivers.

When the power switch 91 on the control box 71 is switched on, power is supplied from the power supply 94 to the adjustment unit control section 80. When the driving switch 92 is switched on, a driving command is outputted from the driving command section 95, and the horizontal angle driving circuit 96 and the vertical angle driving circuit 97 drive the horizontal adjustment gear 72 and the vertical adjustment gear 73 by section of the motors 74 and 75, respectively, based on a detection signal level from the level input section 77. A peak position of the detection signal level is determined by the peak position determination section 98.

The horizontal adjustment gear 72 and the vertical adjustment gear 73 automatically change their rotation directions at preset rotation ends, respectively, and the horizontal adjustment dial 33 and the vertical adjustment dial 37 are rotated by predetermined angles, respectively. The adjustment unit control section 80 stops the motors 74 and 75 at a position corresponding to the determined peak position of the detection signal level, and the horizontal angle and the vertical angle of each optical system 12 (detection unit) are set for the object detection device.

The peak position determination section 98 obtains peak positions for two directions, that is, the forward direction and the opposite direction, in the rotation of each of the horizontal and vertical adjustment dials 33 and 37, to determine, as the peak position, a midpoint between peak positions of the detection signal levels for the two directions. Namely, when the horizontal adjustment gear 72 starts to rotate in one direction and detects the end of the rotation in the one direction, the horizontal adjustment gear 72 automatically switches to a rotation in the opposite direction. At this time, while a peak position (P1) is obtained by peak position detection section (not shown), and the peak position (P1) is stored, the horizontal adjustment gear 72 is rotated until the end of the rotation in the opposite direction is detected. Next, when the end of the rotation in the opposite direction is detected, the horizontal adjustment gear 72 automatically switches to a rotation in the opposite direction (the one direction). At this time, while a peak position (P2) is similarly obtained by the peak position detection section, and the peak position (P2) is stored, the horizontal adjustment gear 72 is rotated until the end of the rotation in the one direction is detected. Thereafter, the horizontal adjustment gear 72 is rotated to a midpoint between the peak position (P1) and the peak position (P2), and is stopped at the position corresponding to the peak position in the horizontal direction. The same operation as described above is performed for the vertical adjustment gear 73, and the vertical adjustment gear 73 is stopped at the position corresponding to the peak position in the vertical direction.

Thus, peak deviation due to hysteresis of the motors 74 and 75, backlash of the horizontal and the vertical adjustment gears 72 and 73, or the like can be prevented, and the peak position of the detection signal level can be accurately determined.

Figure 12:
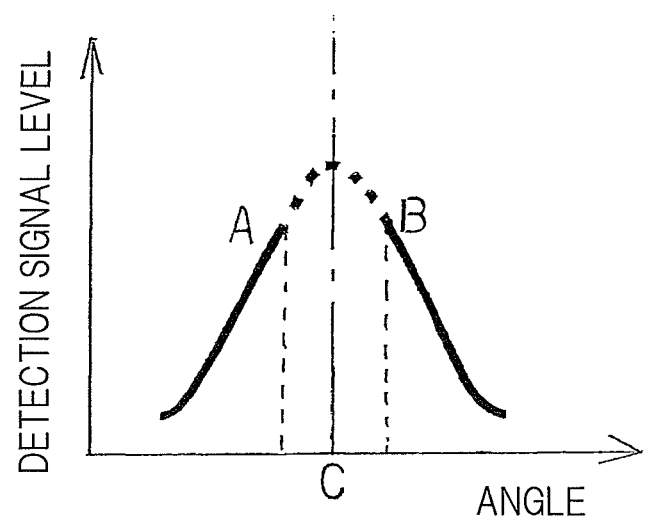
FIG. 12 illustrates an exemplary operation of the object detection system.

Further, when the detection signal level represents a saturated state as shown in FIG. 12, and a detection signal peak position cannot be detected, the peak position determination section 98 determines a peak position of the detection signal level, based on a midpoint C between a rising edge position A at which a saturation point is reached, and a falling edge position B at which the saturated state ends. Namely, the midpoint C is estimated as the peak position, the detection is performed for the forward direction and the opposite direction of a rotation as described above, and a midpoint between the estimated peak positions is determined as the peak position. Thus, even when the detection signal level represents the saturated state, the peak position of the detection signal level can be accurately determined.

The horizontal angle adjustment section of the rotation holder 32 and the vertical angle adjustment section of the conrod 36 are adjusted independently of each other. However, when the horizontal angle is firstly adjusted, the vertical angle is not always at the peak position, and a peak of the horizontal angle can be merely adjusted provisionally. In a case where, after the peak of the horizontal angle is provisionally obtained, a peak of the vertical angle is adjusted, the peak of the vertical angle approaches a true value. However, the horizontal angle needs to be adjusted again in order to cause the peak of the horizontal angle having been provisionally obtained to approach a true value. Therefore, after the vertical adjustment is performed and the horizontal adjustment is then performed, or after the horizontal adjustment is performed and the vertical adjustment is then performed, the peak position determination section 98 performs the vertical adjustment or the horizontal adjustment, that is, repeats one of the vertical adjustment or the horizontal adjustment at least once, thereby determining the peak position of the detection signal level. Namely, [the vertical adjustment-the horizontal adjustment-the vertical adjustment], or [the horizontal adjustment-the vertical adjustment-the horizontal adjustment] is performed. The adjustment is performed at least three times in total. Alternately performing the vertical adjustment and the horizontal adjustment may be repeated at least twice. Thus, the optical axis adjustment can be performed with an enhanced accuracy.

When the automatic angle adjustment unit has a GPS function incorporated therein, and has communication section for allowing two automatic angle units to communicate their positional information to each other, a coarse adjustment can be performed according to the mounting-position information. Further, when the communication section is used, even the object detection device D in which the transmission section 1 and the reception section 2 do not have communication functions for transmitting and receiving detection signal levels is allowed to perform automatic angle adjustment of a light emitting section. In this case, when the driving switch 92 is firstly switched on, a coarse adjustment according to the positional information from the GPS is performed, and the fine adjustment according to the detection signal level is then performed.

In each of the embodiments described above, the horizontal adjustment dial and the vertical adjustment dial are each disposed so as to rotate about the vertical axis. However, the vertical angle adjustment section may be formed as, for example, a rack and pinion mechanism, so as to rotate the vertical adjustment dial about the horizontal axis.

In each of the embodiments described above, infrared rays are used as detection beams. However, the present invention is not limited thereto. For example, a visible ray, microwave, laser light, or the like may be used as the detection beams. Further, according to detection beams, a detection unit implemented as an optical system may use an unit, such as an antenna, for effectively transmitting and receiving the detection beams.

When the receivers 2A and 2B disposed on the upper portion and the lower portion are connected by section of the shaft portion 52 of each conrod 36, the receivers 2A and 2B disposed on the upper portion and the lower portion can be adjusted, through one operation, by the automatic angle adjustment unit 70. Further, the automatic angle adjustment unit 70 is also applicable to an object detection device using a retroreflective mirror for reflecting detection beams transmitted from a transmitter and allowing a receiver to receive the detection beams, as well as the detectors in which the transmitter and the receiver are disposed so as to oppose each other.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS 1 transmission section
1A, 1B transmitter
2 reception section
2A, 2B receiver
5 level detection section
7 level output section
10 control section
11 transmitting detection unit (optical system)
12 receiving detection unit (optical system)
30 angle adjustment mechanism
31 horizontal angle adjustment section
32 horizontal rotation component (rotation holder)
33 horizontal adjustment-engagement member (horizontal adjustment dial)
35 vertical angle adjustment section
36 vertical rotation component (conrod)
37 vertical adjustment-engagement member (vertical adjustment dial)
60 holder
70 automatic angle adjustment unit
72, 73 engagement-drive transmission section
74, 75 driving section (motor)
76 clamping section 77 level input section
80 adjustment unit control section
98 peak position determination section
D object detection device

What is claimed is:

1. An automatic angle adjustment unit for use in an object detection device, the object detection device causing a receiving detection unit of a receiver to receive detection beams, for object detection, transmitted from a transmitting detection unit of a transmitter and to output a detection signal,
  in which the object detection device includes an angle adjustment mechanism that has a horizontal adjustment-engagement member and a vertical adjustment-engagement member, disposed adjacent to each other, which adjust a horizontal angle of at least one of the receiving detection unit and the transmitting detection unit rotatable about a vertical axis and a vertical angle of at least one of the detection units rotatable about a horizontal axis, and
  in which the automatic angle adjustment unit is engageable with the horizontal adjustment-engagement member and the vertical adjustment-engagement member of the object detection device, to drive both adjustment-engagement members from the exterior and to adjust the horizontal angle and the vertical angle of at least one of the detection units, thereby to perform automatic angle adjustment,
  the automatic angle adjustment unit comprising:
  an engagement-drive transmission section that removably engages with the horizontal adjustment-engagement member and the vertical adjustment-engagement member from the exterior, and drives both adjustment-engagement members;
  a driving section for driving the engagement-drive transmission section;
  a clamping section for removably securing the automatic angle adjustment unit to the object detection device;
  a level input section for receiving the detection signal level inputted from the object detection device; and
  an adjustment unit control section for performing a control for causing the driving section to drive the engagement-drive transmission section based on the detection signal level, to adjust the horizontal angle and the vertical angle of at least one of the detection units.

2. The automatic angle adjustment unit according to claim 1, wherein the clamping section includes an ejection section that operates in conjunction with the automatic angle adjustment unit being disengaged from the object detection device such that the engagement-drive transmission section is moved in a direction opposite to a direction in which the engagement-drive transmission section engages with the horizontal adjustment-engagement member and the vertical adjustment-engagement member, to cancel the engagement therebetween.

3. The automatic angle adjustment unit according to claim 1, further comprising:
  a GPS section for obtaining positional information; and
  a communication section for communicating and exchanging the positional information between a plurality of the automatic angle adjustment unit, wherein
  a coarse adjustment of an angle for the object detection device is automatically performed based on the positional information.

4. An object detection system comprising:
  the automatic angle adjustment unit according to claim 1; wherein
  the adjustment unit control section of the automatic angle adjustment unit has peak position determination section for determining a peak position of the detection signal level, drives the driving section, and causes the engagement-drive transmission section to stop the horizontal adjustment-engagement member and the vertical adjustment-engagement member at a position corresponding to the determined peak position of the detection signal level, to set the horizontal angle and the vertical angle of at least one of the detection units of the object detection device.

5. The object detection system according to claim 4, wherein
  the peak position determination section obtains peak positions for two directions, which are a forward direction and an opposite direction, in rotation of each of the horizontal adjustment-engagement member and the vertical adjustment-engagement member, and determines, as the peak position, a midpoint between the peak positions of the detection signal levels for the two directions.

6. The object detection system according to claim 4, wherein
  when the detection signal level represents a saturated state, the peak position determination section determines the peak position of the detection signal level based on a midpoint between a rising edge position at which a saturation point is reached, and a falling edge position at which the saturated state ends.

7. The object detection system according to claim 4, wherein
  after a vertical adjustment is performed and a horizontal adjustment is then performed, or after the horizontal adjustment is performed and the vertical adjustment is then performed, the peak position determination section performs the vertical adjustment or the horizontal adjustment by repeating one of the vertical adjustment or the horizontal adjustment at least once, to determine the peak position of the detection signal level.

* * * * *